United States Patent [19]

Baker et al.

[11] Patent Number: 5,762,685
[45] Date of Patent: Jun. 9, 1998

[54] MEMBRANE EXPANSION PROCESS FOR ORGANIC COMPONENT RECOVERY FROM GASES

[75] Inventors: Richard W. Baker, Palo Alto; Kaaeid A. Lokhandwala, Menlo Park, both of Calif.

[73] Assignee: Membrane Technology and Research, Inc., Menlo Park, Calif.

[21] Appl. No.: 788,629

[22] Filed: Jan. 24, 1997

[51] Int. Cl.$^6$ ................................................ B01D 53/22
[52] U.S. Cl. ................................ 95/39; 95/50; 95/288
[58] Field of Search .......................... 95/39, 45, 50, 95/288

[56] References Cited

U.S. PATENT DOCUMENTS

| | | | |
|---|---|---|---|
| 3,903,708 | 9/1975 | Mair | 95/39 X |
| 4,857,078 | 8/1989 | Watler | 55/16 |
| 4,994,094 | 2/1991 | Behling et al. | 95/39 |
| 5,089,033 | 2/1992 | Wijmans | 55/16 |
| 5,199,962 | 4/1993 | Wijmans | 55/16 |
| 5,205,843 | 4/1993 | Kaschemekat et al. | 55/16 |
| 5,281,255 | 1/1994 | Toy et al. | 95/50 |
| 5,352,272 | 10/1994 | Moll et al. | 96/9 |
| 5,374,300 | 12/1994 | Kaschemekat et al. | 95/39 |
| 5,501,722 | 3/1996 | Toy et al. | 95/50 |

OTHER PUBLICATIONS

R. Rautenbach et al., *Membrane Processes*, pp. 439-442, John Wiley & Sons Ltd., NY (1989).

H. Gorissen, "Temperature Changes Involved in Membrane Gas Separations," *Chem. Eng. Proc.* 22, pp. 63-67, (1987).

*Primary Examiner*—Robert Spitzer
*Attorney, Agent, or Firm*—J. Farrant

[57] ABSTRACT

A process for recovering organic components from gas streams by condensation. The process uses a semipermeable separation membrane as an expansion device to provide cooling for condensation.

34 Claims, 16 Drawing Sheets

MEMBRANE EXPANSION PROCESS FOR ORGANIC COMPONENT RECOVERY FROM GASES

FIELD OF THE INVENTION

The invention relates to recovery of organic components from gas streams by condensation. More particularly, the invention relates to the use of a semipermeable separation membrane to facilitate condensation by providing cooling.

BACKGROUND OF THE INVENTION

Condensation is a ubiquitous method of separating organic components of higher boiling point from inorganic gases or from other lower boiling organics. The cooling required for condensation comes from diverse sources, ranging from air at ambient temperature down to cryogenic liquids, depending on the temperature that has to be reached. In many processes, at least some refrigeration is needed to provide a low enough temperature. Almost as widespread as condensation itself is the desire to cut the costs associated therewith.

In principle, the temperature of an ideal gas expanding without producing external work should stay constant; in practice, gases are non-ideal and the work that must be done to overcome attractions between molecules results in cooling as the gas expands. This phenomenon is widely known as the Joule-Thomson effect. It has been recognized for some time that the transport of gas from feed to permeate side in membrane separation processes can be viewed as a non-ideal gas expansion, and is thus likely to manifest the Joule-Thomson effect. This is discussed, for example, on pages 439–441 of Chapter 13 of "Membrane Processes" by R. Rautenbach and R. Albrecht, John Wiley and Sons, New York, 1989. The chapter indicates that the Joule-Thomson coefficient, that is, the temperature change per unit pressure change under adiabatic conditions, is very small for most gases commonly separated by membranes, such as oxygen, nitrogen, hydrogen, carbon monoxide and methane. Only for carbon dioxide is a coefficient large enough to produce a significant cooling effect reported.

This cooling is generally regarded as undesirable, because it can give rise to condensation of high-boiling components of the feed on the membrane surface. For example, membranes are used to separate carbon dioxide from the hydrocarbon components of natural gas. As the carbon dioxide concentration of the feed falls, the concentration of heavier hydrocarbons such as pentane and above, which permeate more slowly than carbon dioxide, may increase on the feed side until the dewpoint is reached. The heavier hydrocarbons then begin to form an oily condensate on the membrane surface, with results varying from diminished performance to complete destruction of the membrane. This condensation problem is exacerbated by the cooling that results from carbon dioxide permeation. To protect the membranes, the feed gas is often heated by as much as 20° C. before it enters the membrane modules, and/or the feed must be pretreated to lower the hydrocarbon dewpoint to a safe level.

Another issue is that the transmembrane flux of many gases through many membranes decreases with decreasing temperature. Thus, most commercial membrane processes are operated at ambient temperature or above. However, U.S. Pat. No. 5,352,272, to Moll et al., describes processes for operating certain glassy membranes at temperatures of 5° C. or below, such as in the case of oxygen/nitrogen separation, where relatively poor membrane selectivity is a problem, to improve separation performance. The patent shows an example, Example 10, in which self-refrigeration of the feed gas to the desired operating temperature is provided by Joule-Thomson cooling.

That membranes can separate organic vapors from gas mixtures, such as natural gas, is known, for example from U.S. Pat. Nos. 4,857,078, 5,281,255 and 5,501,722. In fact, separation of organic vapors from air and other gas mixtures is now being done on the industrial scale to a limited extent.

It has also been recognized that condensation and membrane separation may be combined to treat gas streams containing organic vapors, as is shown in U.S. Pat. Nos. 5,089,033; 5,199,962; 5,205,843 and 5,374,300. In these processes, the gas stream is usually compressed and cooled to cause condensation of a portion of the organic component. The off-gas from the condenser is passed to the membrane separation unit, which produces a relatively clean organic-depleted gas stream and an organic-enriched stream that is looped back to the condensation step. Condensation and membrane separation are integrated to provide favorable operating conditions for both unit operations. For example, the recirculation loop may be used to build up the concentration of the organic component, so that the condensation step can be operated under milder conditions than would otherwise be possible.

However, to applicants' knowledge, membrane separation has not been used as described herein to provide cooling for condensation.

SUMMARY OF THE INVENTION

The invention is a process for recovering an organic component of a gas stream by subjecting the gas stream to pressure and temperature conditions under which at least a portion of the organic component will condense. The invention involves using a semipermeable membrane as an expansion device. Gas containing the organic component is fed to the membrane, which is chosen to be selective for the organic component, that is, it has a higher permeability for that component than for another component of the stream. A pressure difference is provided between the feed and permeate sides of the membrane. Under this driving force, the organic component permeates the membrane preferentially, so that the permeate stream is enriched in organic component compared with the feed. As it passes through the membrane to the low-pressure side, the permeate gas expands and cools. The degree of cooling that occurs depends on the amount of gas that expands through the membrane, the pressure change, and the physical properties of the gas itself. For most non-organic gases, as mentioned above, this effect is very small and would not be of practical value. However, we have found for many organic components that cooling of 5° C., 10° C., 15° C., 20° C. or more can be made to occur, provided that a significant amount of the organic component can pass through the membrane and the difference between the feed and permeate pressure is reasonably large.

The feed and permeate sides of a membrane are separated by only the very thin polymer membrane layer and are in good thermal contact. Although it is expansion to the permeate side that produces the cooling, the use of the membrane as an expansion device therefore typically results in two streams, the permeate and residue streams, that are both significantly colder than the gas that was fed to the membrane. In experimental tests, we have found in some cases that the residue and permeate streams are at about the same temperature; in other cases we have found that the residue stream is the colder. Either the residue or the permeate, or both, can be used to cool the raw gas stream from which the organic component is to be recovered. Such cooling can be accomplished by running one or both of these streams against the raw stream in a heat exchanger. As the raw gas cools, some of the organic component condenses out and can then be recovered in liquid form. The uncondensed part of the stream is used to provide the feed to the membrane expander.

In a basic embodiment, therefore, the process has two steps:

(a) using an organic-component selective semipermeable membrane as an expansion device to expand a portion of a feed gas supplied to the membrane through the membrane to its permeate side; and (b) using at least one cooled stream resulting from step (a) to cool the raw gas stream upstream of the membrane by heat exchange, thereby inducing condensation of at least some of the organic component upstream of said membrane and leaving an uncondensed gas stream that then forms the feed gas to the membrane expander.

The maximum benefit from the membrane expander will usually be obtained by using both the residue and permeate streams to provide cooling. As in all processes, however, there are trade-offs between operating parameters, costs and results that influence the specific manner in which the process will be carried out in a specific situation. Therefore, processes in which only one or the other of the streams from the membrane is used for cooling can be used if desired and are within the scope of the invention.

Optionally, the cooling provided by the membrane expander may be supplemented by cooling from another source. For example, a refrigerated stream from another part of the plant may be used. Alternatively, the membrane expander may be used to reduce the cooling capacity requirement from other sources.

Since the membrane is deliberately chosen to be organic-selective to obtain a substantial cooling, the permeate stream is by definition enriched in the organic component. Thus, it is preferred, although optional, to pass this stream back to the condensation step (b). This has the beneficial effect of increasing the recovery of liquefied organic component.

Another related benefit is that the uncondensed gas that is used as feed for the semipermeable membrane expander is at a low temperature. This may result in a better separation of the organic from the other components by the membrane, and increases the recovery of organic when the permeate stream is returned for condensation. For organic-selective membranes, loss of flux at low temperatures is not usually a problem. The membranes are generally either rubbery or superglassy, as explained below. These membranes have much higher fluxes than do the glassy membranes used to separate oxygen from nitrogen, for example, so even substantial drops of flux under low temperature operation would be acceptable. However, for rubbery and superglassy membranes, the flux of the organic component typically increases with decreasing temperature. Thus, operation at lower temperature may bring the joint benefits of improved flux and better separation of the preferred permeant.

DETAILED DESCRIPTION OF THE INVENTION

Figure 1:
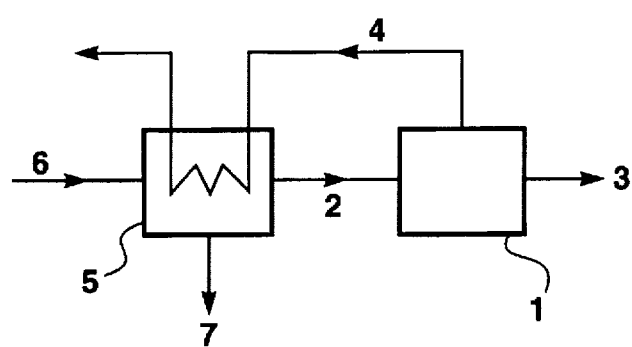
FIG. 1 is a schematic drawing showing a basic embodiment of the process of the invention.

The term gas as used herein means gas or vapor.

The term $C_{2+}$ hydrocarbon means an unsubstituted or substituted hydrocarbon having at least two carbon atoms; the term $C_{3+}$ hydrocarbon means an unsubstituted or substituted hydrocarbon having at least three carbon atoms, and so on.

The term organic component means any component having a molecule with at least two carbon atoms.

Percentages herein are by volume unless otherwise stated.

The invention is an improved process for recovering an organic component of a gas stream by condensation. The streams that may be treated by the process of the invention are diverse. Representative examples include, but are not limited to, streams containing $C_{3+}$ hydrocarbons from gas and oil wells of all types, streams containing various olefins and paraffins from petrochemical processing operations such as cracking or refining, streams containing organic reagents from chemical manufacturing, polymer manufacturing purge or reactor streams, streams containing organic solvents, including halogenated solvents, waste air streams, and vent streams from fuel, solvent or other organic liquid storage tanks.

The invention involves using a semipermeable membrane as an expansion device to provide at least part of the cooling required for condensation. The invention in its most basic form is shown schematically in FIG. 1. Referring to this figure, stream 6 is the raw organic-component-containing stream to be treated, and stream 2 forms the feed stream to the membrane expander. The goal is to expand a portion of stream 2 through the membrane to the permeate side, thereby cooling both the expanded permeate stream and the residue stream that remains on the feed side of the membrane.

The degree of cooling that occurs depends on the amount of gas that expands through the membrane, the pressure change, and the physical properties of the gas itself. Most of the gases that are separated by membranes on a commercial basis cannot produce enough cooling to make a membrane expander feasible as a practical device. However, we used the SRK (Soave Redlich Kwong) equation of state and calculated the Joule-Thomson coefficients for a number of materials in the 1 to 10 bar pressure range to be as follows:

| | |
|---|---|
| Hydrogen | −0.017 °K./bar |
| Nitrogen | 0.232 |
| Oxygen | 0.232 |
| Methane | 0.459 |
| Carbon monoxide | 0.232 |
| Carbon dioxide | 1.08 |
| Ethylene | 1.05 |
| Ethane | 1.15 |
| Propylene | 1.55 |
| Propane | 1.80 |
| n-Butane | 1.98 |

As can be seen, the coefficients for the $C_{2+}$ hydrocarbons are typically much higher than those of the inorganic gases, such as 1.55 for propylene, compared with 0.46 for methane and 0.23 for nitrogen, for example.

Furthermore, as has not generally been recognized, since it is the physical properties of the permeating, expanding gas that determine the cooling effect, the selectivity of the membrane affects the degree of cooling. Where the gases to be separated have significantly different Joule-Thomson coefficients, the cooling that occurs will be markedly different depending which component passes preferentially. Thus, to take advantage of the cooling capacity of organic components, it is essential that the membrane expander use a membrane that preferentially permeates the organic component over another component, that is, the membrane must be organic component selective.

Box 1 represents the membrane expansion device. This contains sufficient membrane modules to provide the required membrane area for the expander, discussed in more detail below.

To provide an organic component selective membrane, the membrane is preferably made from an elastomeric or rubbery polymer. Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cispolyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

Alternatively, the membrane can be made from a super-glassy polymer. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable, organic molecules over smaller inorganic or less condensable organic molecules. The best known super-glassy polymer identified to date is poly(trimethylsilylpropyne) [PTMSP], the use of which to preferentially separate condensable components from lower-boiling, less condensable components is described in U.S. Pat. No. 5,281,255, for example. This type of membrane would be useful in the present invention as an organic-component selective membrane. The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If super-glassy membranes are used, they may be formed as integral asymmetric or composite membranes.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should preferably have a selectivity for the organic component that provides the expansion medium over the other component of at least about 5, more preferably at least about 10 and most preferably at least about 20, and a pressure-normalized flux of the expansion medium of at least about $1\times10^{-5}$ cm$^3$(STP)/cm$^2$.s.cmHg, more preferably at least about $1\times10^{-4}$ cm$^3$(STP)/cm$^2$.s.cmHg.

To promote transmembrane permeation, there must be a pressure difference between the feed and permeate sides of the membrane. If stream 2 is already at high pressure, as will often be the case, then adequate driving force and adequate expansion may be available with the permeate side of the membrane maintained at atmospheric pressure. If stream 2 is not at sufficiently high pressure, additional pressure difference may be provided by connecting a vacuum pump or compressor in the permeate outlet line, thereby drawing a partial vacuum on the permeate side of the membrane, or by compressing stream 2.

Figure 10:
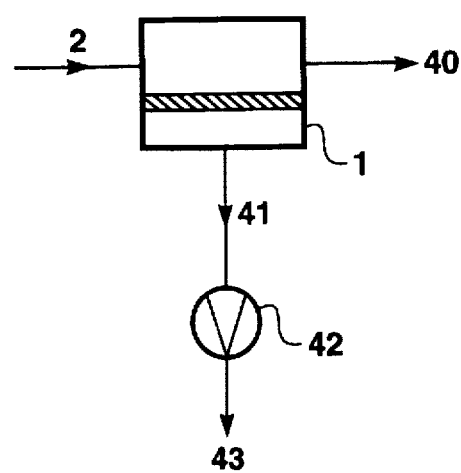
FIG. 10 is a schematic drawing showing a vacuum pump in the permeate line from the membrane expander.

An arrangement in which a partial vacuum is drawn on the permeate side of the membrane expander is shown in FIG. 10, in which like elements are numbered as in FIG. 1. Referring to this figure, the membrane expander produces residue stream 40 and permeate stream 41. The pressure on the permeate side is reduced by vacuum pump, 42 to a value that can vary from just below atmospheric, such as 14 psia, down to a fairly hard vacuum, such as a few torr, depending on the specific circumstances of use. Stream 43, on the exhaust side of the pump, may be at close to atmospheric pressure, or may be slightly compressed, such as at 30 psia, 50 psia or above, depending on the pump used. Alternatively, a compressor may be used in place of vacuum pump 42. The suction side of the compressor may then be at slightly lower than atmospheric pressure, such as 3–10 psia, and the exhaust side is at elevated pressure. This has the benefit of both increasing the pressure drop across the membrane expander and providing a compressed permeate stream for condensation or some other destination.

The pressure difference across the membrane expander is important, because it is a measure of how much expansion takes place from the feed to the permeate side, and hence the temperature drop that is achieved. It is preferred, therefore, to operate with a feed/permeate pressure drop, that is, a total pressure difference between the feed inlet and permeate outlet of at least about 100 psi, more preferably at least about 200 psi, 300 psi or 500 psi, and most preferably at least about 800 psi.

Another important factor in achieving useful cooling is the amount of gas that expands across the membrane. This depends in part on the organic content of the membrane feed stream 2. Since this stream is the off-gas stream from the condenser, 5, it is saturated with the organic component under the pressure and temperature conditions of the condenser. However, if the saturation concentration of the organic is in the ppm or low percentage levels, then even if essentially all of this organic reaches the permeate side, the resulting temperature drop of the permeate and residue streams may be insignificant, even if the organic has a high Joule-Thomson coefficient, so that the expander provides little useful cooling. Thus the preferred organic component that is suitable for driving the expander should be volatile enough that the vapor phase can retain at least about 3 vol%, more preferably at least about 5 vol%, yet more preferably at least about 10 vol%, and most preferably at least about 20 vol% under the condensation conditions. This means that the preferred organic components that are suitable for use as the expansion medium in the membrane expander have, at least unless the condensation is performed under unusual conditions, saturated vapor pressures under ambient conditions (20° C., 1 atm total pressure) of at least about 5 psia, more preferably at least about 10 psia and most preferably at least about 15 psia. Thus, preferred suitable expansion media include the $C_2$–$C_4$ hydrocarbons, that is ethane, propane, butane, ethylene, propylene, butylene, and substituted equivalents. Other suitable expansion media are certain halogenated compounds, such as some of the perfluorinated hydrocarbons, including perfluoroethylene and perfluoropropylene, that meet the volatility criteria. The most preferred expansion media are the $C_2$ and $C_3$ hydrocarbons. In many cases, gases that are available for use as the expansion medium will comprise a mixture of hydrocarbons, such as mixtures of various concentrations of $C_1$–$C_6$ or heavier hydrocarbons. Examples of such gases include natural gas, associated gas, off-gases from refineries and crackers and the like. Such gas combinations provide a suitable and preferred expansion medium, so long as the total organic content meets the vapor phase concentration and pressure guidelines above.

The amount of gas that expands across the membrane also depends on the stage cut. In membrane separation processes, the stage cut is defined as the ratio of the total permeate to total feed, or as the ratio of the permeate flow to the feed flow. The degree of removal of the more permeable component from the feed depends on the stage cut. To get the maximum cooling effect, the degree of removal of the organic component that serves as the expansion medium from the feed into the permeate should be high, such as 50%, 60% or above, and preferably higher, such as 80%, 90%, 95%, 99% or more, since the Joule-Thomson cooling capacity of any organic that remains on the feed side is wasted. If the membrane were infinitely selective, such a result could be achieved at low stage cut. For example, to remove all of the organic from a feed containing 5% organic would require a stage cut of 5%. Since membranes are not infinitely selective, however, a proportion of the slower permeating components will always pass through and the stage cut to achieve a certain level of organic component transport will be higher. To ensure good organic removal, we prefer to operate the expander at a relatively high stage cut, such as at least 20%, at least 30% or at least 40%, and often much higher, such as 50% or more, depending of course on the original concentration of the organic in the feed and the selectivity of the membrane. That is, the portion that expands across the membrane is at least about 30%, 40% or 50% by volume of the feed gas.

The amount of membrane area required for the expander will depend, in addition to the permeability of the membrane material, on the stage cut, since the greater the amount of gas that has to pass across the membrane, the more membrane area will be needed.

The membrane area within the membrane expansion unit may be contained in a single bank of membrane modules. Alternatively, any other configurations known in the art can be used as convenient. These include, but are not limited to, two-stage or multi-stage configurations, in which the permeate from one module or bank of modules is fed to the next stage, and two-step or multi-step configurations, in which the residue from one module or bank of modules is fed to the next step.

In summary, the most preferred combination of characteristics for the semipermeable membrane expander is:

1. Runs on a feed gas containing a $C_2$–$C_4$ organic component as at least part of the expansion medium.
2. Contains a membrane that is selective for the organic expansion gas, with a selectivity for this gas of at least about 5.
3. The expansion medium (single component or mixture) is present in the feed in a concentration of at least about 3%.
4. Runs at a stage cut of at least about 20%, or at whatever stage cut will achieve permeation of at least about 60% of the organic component, or mixture of components, present in the feed.
5. Runs with a pressure difference of at least about 100 psi between the feed inlet and permeate outlet.

If these conditions can be met, we have found that it is possible to obtain a temperature drop between the feed and residue streams of at least about 5° C. or 10° C., and frequently at least about 15° C., 20° C., 25° C. or more. In general, for the membrane expander to be useful as a cooling device, the minimum temperature drop that is required is at least 5° C., and obviously larger temperature drops are preferred.

The permeate and residue streams leaving the membrane expansion unit are, nonspecifically, streams 3 and 4. In the most basic embodiment of the invention as shown in FIG. 1, one of these streams, either the residue or the permeate stream, is used to provide cooling for condensation. This is done by running the chosen stream against the raw gas stream, 6, from which the organic component is to be condensed, in a heat exchanger or condenser, 5. The temperature at which the heat exchanger or condenser is operated varies, depending on the properties of the organic component that is to be liquefied, the pressure at which the condenser is operated and the extent of removal required. For example, if the organic component to be condensed is a relatively involatile material, such as a hydrocarbon that is liquid under ambient conditions, then much less cooling will obviously be required than if the component to be condensed is ethylene. FIG. 1 shows cooling provided only by one stream from the membrane expander; it will be clear to those of skill in the art that, where lower temperatures are required than can be provided in this way, the cooling can be supplemented from other sources as discussed further below.

Figure 11:
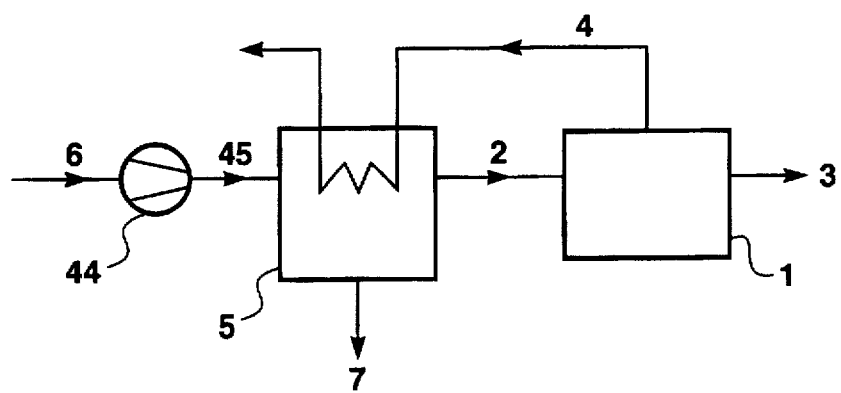
FIG. 11 is a schematic drawing showing an embodiment of the invention in which the raw gas stream is compressed.

Certain gas streams for which the process of the invention can be used are at high pressure, such as above about 500 psia, before entering the process. Such streams include some natural gas streams and streams from processes that themselves operate at high pressure. Other streams, such as solvent-containing waste streams and various process vent streams, may be available only at atmospheric pressure. It is generally preferable if the condenser is operated at reasonably high pressure, such as at least about 50 psia, more preferably at least about 150 psia, yet more preferably at least about 300 psia, and most preferably higher, in some cases much higher, such as 500 psia, 1,000 psia or above, depending on the volatility of the component that is to be condensed. Many embodiments of the invention, therefore, involve compressing the raw gas stream prior to feeding it to the heat exchanger. A typical embodiment of this type is shown in FIG. 11, in which like elements are numbered as in FIG. 1. In this figure, the raw gas stream, 6, first enters compressor, 44, where its pressure is raised to a desired value. Of course, the compressor will normally include an aftercooler, not shown, which typically lowers the temperature of the exhaust gas to a temperature of about 25° C., 35° C., 45° C. or the like. High pressure stream 45 then enters the heat exchanger 5. Carrying out the condensation at elevated pressure both reduces the level of cooling required for condensation, and yields an uncondensed stream, 2, at high pressure to drive the membrane expander.

In both FIG. 1 and FIG. 11, the organic condensate is withdrawn as stream 7. The uncondensed stream, 2, containing the portion of the organic component that has not been liquefied, as well as the other uncondensed components of stream 6, is used to provide the feed for the membrane expander.

In FIG. 1, as well as the other drawing figures, the heat exchanger or condenser is represented by a single box. It will be appreciated by those of skill in the art that, in many cases, the stream emerging from the heat exchanger will be in the form of a gas/liquid mixture, which then passes through a gas/liquid separator or the like for splitting into the discrete gas and liquid streams 2 and 7.

Many gas streams contain more than one organic component. For example, natural gas, associated gas, streams from petrochemical processing, and certain fuel vapors commonly include mixtures of hydrocarbons. The component or mix of components that is used as the expansion medium in the membrane expander may be different from the component or mix of components that is to be recovered in the condenser, or may be the same. For example, the expander may be run predominantly on the cooling provided by permeation of ethane and propane, but the condenser may liquefy predominantly $C_{5+}$ hydrocarbons. On the other hand, in a stream containing essentially propylene and nitrogen, the cooling may be provided by propylene, and propylene will be liquefied in the condenser.

Figure 2:
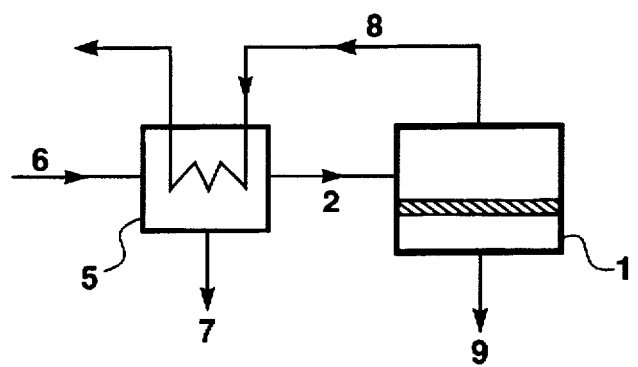
FIG. 2 is a schematic drawing showing an embodiment of the invention in which the residue stream from the membrane expander is used for cooling.

Turning now to FIG. 2, in which like elements are numbered as in FIG. 1, this shows an embodiment of the invention in which the residue stream, 8, rather than the permeate stream, 9, is used in the heat exchanger. We and others have found experimentally that, where the Joule-Thomson effect is measurable, such as in separations involving carbon dioxide permeation, the residue stream emerging from the membrane module can be substantially colder than the permeate stream. In other cases, we have observed the residue and the permeate stream to be at about the same temperature. However, unless the stage cut is greater than 50%, the volume of the residue stream is larger than that of the permeate stream. Also, since the residue stream is at high pressure, a smaller heat exchanger can be used to obtain good thermal contact than is needed for the low pressure permeate gas. Thus, under lower stage cut conditions, if only one stream is to be used to provide cooling, the residue stream is preferred.

Figure 3:
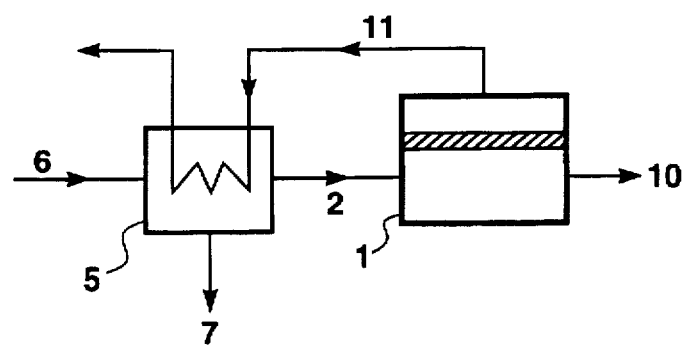
FIG. 3 is a schematic drawing showing an embodiment of the invention in which the permeate stream from the membrane expander is used for cooling.

FIG. 3, in which like elements are again numbered as in FIG. 1, shows an alternative embodiment, in which the permeate stream, 11, rather than the residue stream, 10, is used in the heat exchanger.

Figure 4:
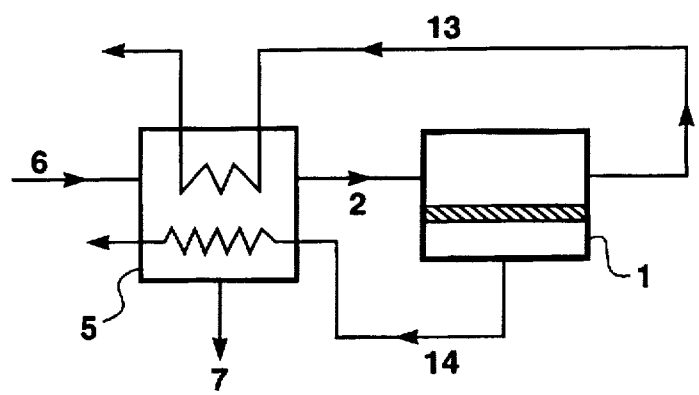
FIG. 4 is a schematic drawing showing an embodiment of the invention in which both the residue and the permeate stream from the membrane expander are used for cooling.

FIG. 4, in which like elements are again numbered as in FIG. 1, shows an embodiment that is preferred over those of FIGS. 2 and 3. In this case, both the residue stream, 13, and the permeate stream, 14, are used to provide cooling in heat exchanger 5, thereby extracting the most cooling capacity from the membrane expander.

Figure 5:
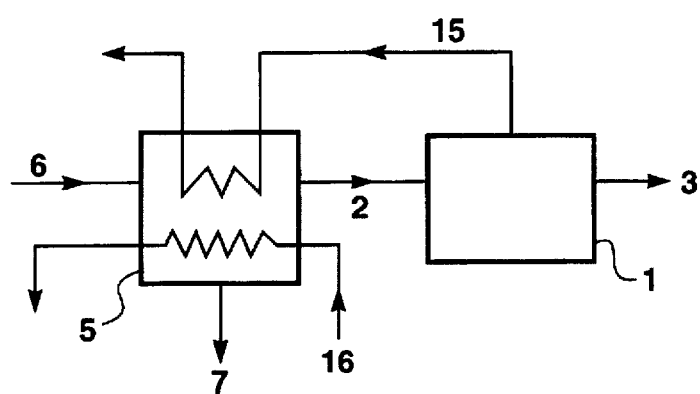
FIG. 5 is a schematic drawing showing an embodiment of the invention in which additional cooling is provided from an external source.

FIG. 5, in which like elements are again numbered as in FIG. 1, shows yet another embodiment in which cooling for heat exchanger 5 is provided by a combination of stream 15, from the membrane expander, and stream 16. Stream 16 is a chilled or refrigerated stream from an external source. This stream may be from any convenient source, such as, but not limited to, a supply of cold water, a fluorocarbon refrigerator, a propane refrigerator, or a refrigeration cascade, if very low temperatures are required. Such embodiments are expected to be widely useful, because the membrane expander can reduce the load on other cooling sources, or conversely, the external cooling source can supplement the capacity of the membrane expander.

Figure 6:
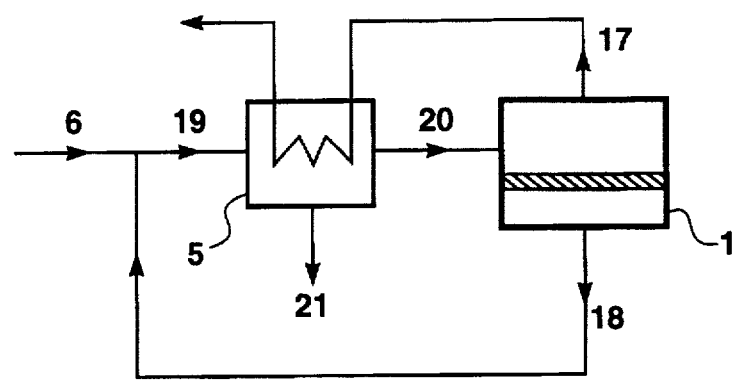
FIG. 6 is a schematic drawing showing an embodiment of the invention in which the permeate stream is fed to the condenser.

As the semipermeable membrane is deliberately chosen to be organic-selective to obtain a substantial cooling, the permeate stream is by definition enriched in the organic component that is used as the expansion medium. If the expansion medium is also the component that is being condensed, it may be convenient to return the permeate stream to the inlet side of the condenser, as shown in FIG. 6. Turning to this figure, the residue stream, 17, from the membrane expander, 1, is used as the coolant for heat exchanger or condenser, 5. The permeate stream, 18, from the expander is recirculated to join raw stream, 6, and the streams pass together as stream 19 into the condenser. Condensate stream, 21, is withdrawn from the process. Uncondensed stream, 20, is used to drive the membrane expander. To match the pressures of streams 6 and 18, stream 18 may be repressurized before mixing with stream 6. Alternatively, if stream 6 is itself at low pressure and has to be compressed at some point upstream of the condenser, stream 18 may be joined with stream 6 for compression.

Figure 7:
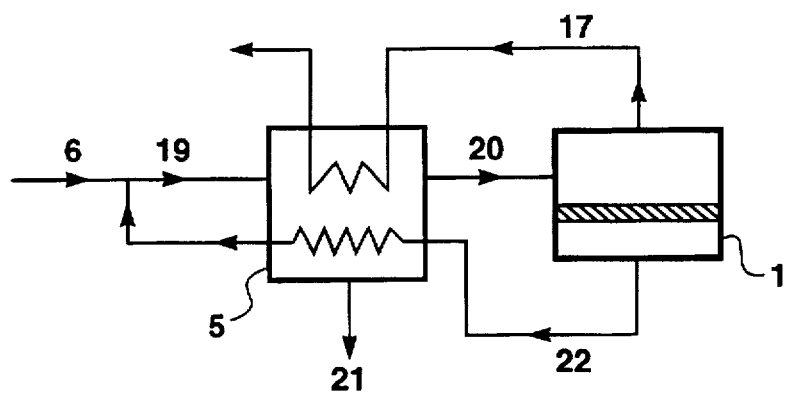
FIG. 7 is a schematic drawing showing an embodiment of the invention in which both the residue and the permeate stream from the membrane expander are used for cooling, and in which the permeate stream is fed to the condenser.

If desired, stream 18 may be used for cooling the heat exchanger instead of stream 17, or more preferably, both may be used for cooling as in FIG. 7, where like elements are numbered as in FIG. 6. In this case, permeate stream 22 passes through the heat exchanger and is then mixed with stream 6 to form stream 19 for condensation.

Such embodiments can be useful, even if the organic component that provides the expansion medium is not the organic component that is the desired condensate, because the loop created by return of the permeate stream 18 or 22 can be used to build up the concentration of the organic component that it is desired to condense. The operation and benefits of such integrated loop arrangements are discussed fully in U.S. Pat. Nos. 5,089,033; 5,199,962; 5,205,843 and 5,374,300, which are incorporated herein by reference in their entirety.

Another related benefit is that the uncondensed gas that is used as feed for the membrane expander is at a comparatively low temperature. It is envisaged that the membrane will often be used as both an expansion/cooling device and a separation device. Operation at the lower temperature will generally result in a better separation performance by the membrane than would otherwise be obtained. In cases as described above, where the membrane permeate is passed to the condenser for organic component recovery, the better separation, and hence more organic-concentrated permeate, will in turn facilitate the recovery of the organic component by condensation. Whatever the destinations of the residue and permeate streams, the improved separation that may result from low temperature membrane operation can often be beneficial.

Figure 8:
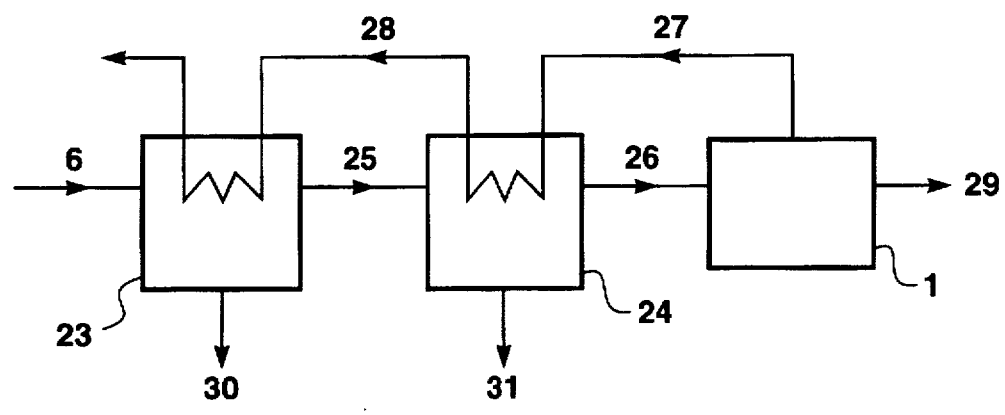
FIG. 8 is a schematic drawing showing an embodiment of the invention in which a stream from the membrane expander is used for cooling in two condensers at different temperatures.

It is not uncommon for condensation to be carried out by multiple condensers in series. Such an arrangement can be used to retrieve condensed fractions of different compositions from a feed containing multiple components with different boiling points, for example, or simply to reach progressively lower temperatures by a series of increments. An embodiment of the invention in which the membrane expander is used to provide cooling for multiple condensers is shown in FIG. 8. Referring to this figure, in which like elements are numbered as in FIG. 1, membrane expander 1 produces streams 27 and 29. Stream 27 is run as coolant through heat exchanger 24, resulting in production of a condensate, 31, and leaving uncondensed stream, 26, which is used as the feed to the membrane expander. Stream 28 emerging from heat exchanger 24 is at a higher temperature than stream 27, but is still substantially cooler than raw gas stream, 6. Stream 28 is passed as coolant through a second heat exchanger 23, which cools the raw gas stream, 6. The cooling of stream 6 produces a higher temperature condensate, 30, and leaves an uncondensed stream, 25, which is passed to the lower temperature condenser.

Figure 9:
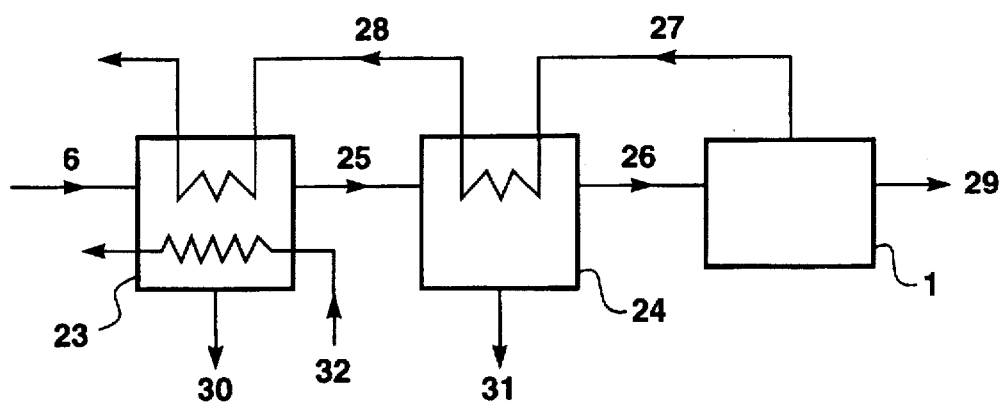
FIG. 9 is a schematic drawing showing an embodiment of the invention in which a stream from the membrane expander is used for cooling in two condensers, in one of which additional cooling is provided from an outside source.

Process configurations of the type shown in FIG. 8 are also useful when external refrigeration is used in conjunction with the cooling from the membrane expander. An arrangement of this type is shown in FIG. 9, in which like elements are numbered as in FIG. 8. As in FIG. 8, two portions of the organic component to be liquefied are recovered as streams 30 and 31 from condensers 23 and 24. Cooling for condenser 23 is provided by a combination of heat exchange against stream 28 and heat exchange against stream 32, where stream 32 comes from an external refrigeration or chilling source. This level of cooling results in condensation of a portion of the desired organic component. The remainder of the desired condensate is recovered in the lower temperature condenser, which is cooled by heat exchange with a stream from the membrane expander. Thus, the external chilling or refrigeration has only to be provided for the higher temperature condenser. In some cases, this may mean that the external cooling can be provided simply by cold water rather than refrigeration, or by fluorocarbon refrigeration rather than propane refrigeration, or by propane refrigeration rather than by a refrigeration cascade, for example.

Figure 12:
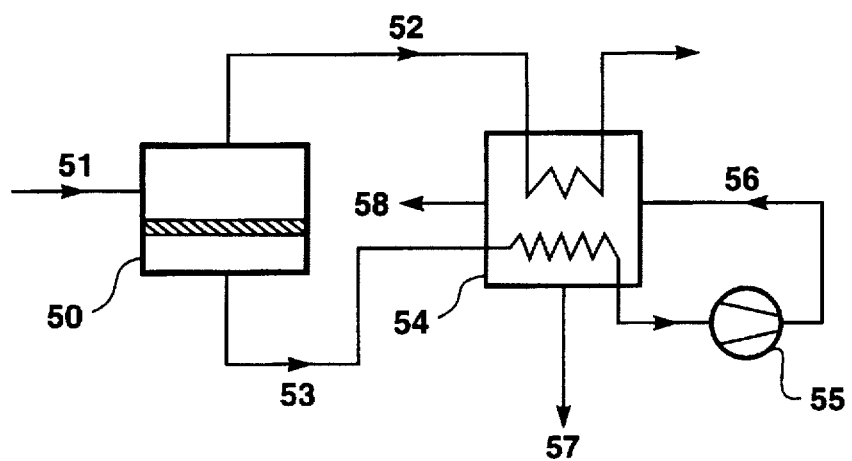
FIG. 12 is a schematic drawing showing an embodiment of the invention in which the permeate stream from the membrane expander is subjected to condensation.

The invention has been described so far in terms of processes in which the membrane expander is driven by the off-gas from the condenser. A different process, in which the expanded permeate gas is condensed using the cooling provided by the expander is shown in FIG. 12. Turning to this figure, stream 51 is the raw organic- component-containing stream to be treated. This stream enters membrane expander, 50, where it is separated into residue stream, 52, and expanded organic-enriched permeate stream, 53. Both of these streams are passed through heat exchanger or condenser, 54, to provide cooling. After leaving the heat exchanger, the permeate stream is compressed in compressor, 55, and enters the condenser as stream 56. Under the cooling provided by streams 52 and 53, a portion of the organic component condenses and can be withdrawn as stream 57. The uncondensed gas phase from the condenser is withdrawn as stream 58. Of course, as with the embodiments already discussed, the process in this aspect can be operated using only one stream from the membrane expander for cooling, or by supplementing the cooling provided by the expander with cooling from an external source.

The invention can be integrated with many separation processes in advantageous ways that will suggest themselves to those of skill in the art based on the teachings herein. As just one nonlimiting example, the process of the invention may be carried out in conjunction with the processes that involve condensation, flash evaporation and membrane separation. Such process are disclosed in co-owned and copending Ser. No. 08/780,868, entitled "Separation Process Combining Condensation, Membrane Separation and Flash Evaporation", which is incorporated herein by reference in its entirety.

Figure 16:
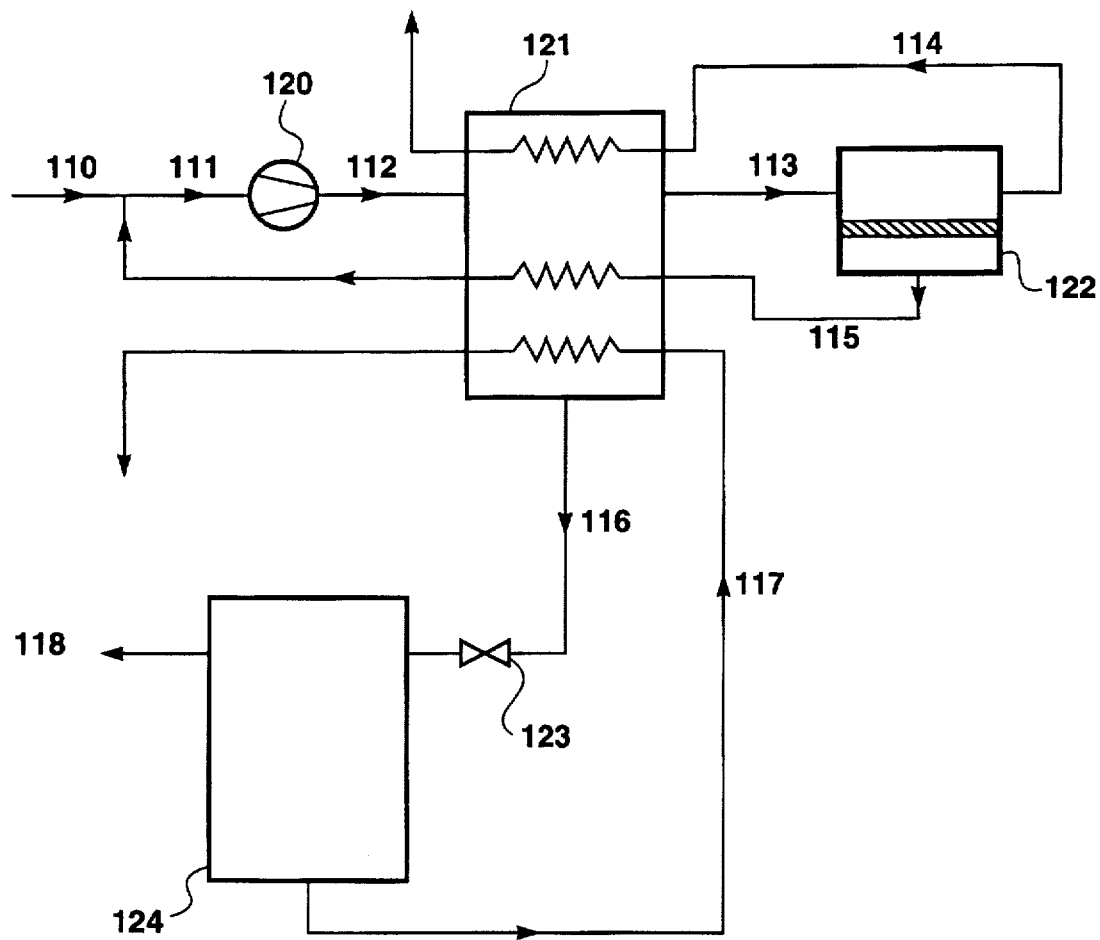
FIG. 16 is a schematic drawing showing an embodiment of the invention in which cooling for the condenser is provided by the membrane residue and permeate streams and by a cold liquid stream from a flash tank.

An arrangement of that type is shown in FIG. 16. Referring to this figure, feed stream, 110, is combined with recirculated membrane permeate stream, 115, to form inlet stream, 111. Stream 111 passes through compressor, 120, to form compressed stream, 112, which then passes through heat exchanger or chiller, 121. In this embodiment, the heat exchanger is cooled by membrane residue stream, 114, membrane permeate stream, 115, and the cold liquid stream, 117, from the flash evaporation step. Thus, in this case, no external refrigeration need be supplied.

The combination of compression and cooling results in the formation of condensed stream, 116, which is passed through expansion valve, 123, and into flash tank, 124. The evolved gas phase, stream 118, can be discharged or recirculated. For even more cooling capacity, stream 118 could also be passed through heat exchanger, 121. In this case, the liquid product from the flash tank has been warmed by passage through the heat exchanger, and may therefore be in the vapor phase rather than liquid, when it is withdrawn as stream 117.

The uncondensed stream, 113, is fed to membrane separation unit, 122. The membrane unit produces organic-depleted residue stream, 114, and organic-enriched permeate stream, 115, which is returned via the heat exchanger to the condensation step.

The invention can also be advantageously combined with the types of separation involving condensation and membrane separation shown in U.S. Pat. Nos. 5,089,033; 5,199, 962; 5,205,843 and 5,374,300.

A few representative, but non-limiting, areas in which the process of the invention is useful are:

1. Recovery of natural gas liquids (NGL) from natural gas. Natural gas is the most important fuel gas in the United States, and is also used extensively as a basic raw material in the petrochemical and other chemical process industries. Before raw gas can be used, it must usually be treated to lower the $C_{3+}$ hydrocarbon dewpoint, to avoid the risk of condensation of liquid hydrocarbons in the gas pipeline or elsewhere. The $C_{3+}$ hydrocarbons are also removed to keep the Btu value of the gas within safe limits, typically 950–1050 Btu/cubic foot, and because they have significant value in their own right as feedstocks and fuels.

The conventional way to separate the $C_{3+}$ hydrocarbon components is by refrigerated condensation, which produces the NGL fraction as a discrete liquid.

2. Polymer manufacturing purge gas treatment. In a typical polymerization process, the raw polymer product contains significant amounts of unreacted monomer, and may contain small amounts of solvents, catalysts, stabilizers, other hydrocarbons or any other materials, depending on the manufacturing process used. To remove these contaminants, the raw polymer resin is passed to large bins, where nitrogen is used to purge them out. The vent gas from this step contains nitrogen, monomer, and other process-specific materials.

These vent gases can be treated by condensation to recover the monomer.

3. Olefin manufacturing. Ethylene and propylene are made by cracking ethane, propane, or sometimes heavier paraffins or naphthas with steam at high temperature. The gas mixture leaving the cracker is typically a mixture of hydrogen, methane, hydrocarbons and carbon dioxide. After the carbon dioxide has been removed, the hydrogen and methane must be separated from the other hydrocarbon gases.

This is usually done by low-temperature condensation.

The invention is now further described by the following examples, which are intended to be illustrative of the invention, but are not intended to limit the scope or underlying principles in any way.

EXAMPLES

Example 1

The cooling that would result from adiabatic expansion of various gases through a throttle valve was calculated using a commercial chemical process simulator, ChemCad III (ChemStations, Inc., Houston, Tex.). The simulator contains appropriate equations of state to enable the effects of expansion to be calculated. We used the SRK (Soave Redlich Kwong) equation of state in all of the calculations reported here.

The gases were assumed to be at an initial pressure of 10 atm, 20 atm or 30 atm and a temperature of 25° C. in all cases, and to be expanded to a pressure of 1 atm. The results are listed in Table 1.

TABLE 1

| | Temperature of gas after adiabatic expansion to 1 atm (°C.) | | | |
|---|---|---|---|---|
| | $H_2$ | $N_2$ | $CH_4$ | $C_2H_6$ |
| 10 | 25.2 | 23.0 | 20.7 | 14.3 |
| 20 | 25.3 | 21.0 | 15.9 | −0.2 |
| 30 | 25.5 | 18.9 | 11.0 | −19.4 |

As can be seen from the table, under these conditions the inorganic gases manifest modest cooling, or, in the case of hydrogen, slight warming. In contrast, ethane cools by almost 10° C. as a result of even a modest pressure drop of 10 atm, or 150 psi.

We also calculated the cooling that would result from expansion of propylene. Pure propylene is a liquid at the pressures in the table, but if the saturated vapor at a pressure of 9 atm and 25° C. is expanded to 1 atm, the temperature after expansion is 10.4° C., a cooling of close to 15° C.

Example 2

A set of calculations was performed to evaluate the cooling that could be obtained by expanding a mixture of equal volumes of ethane and nitrogen across a membrane expander to a permeate pressure of 1 atm (15 psia). The membrane was assumed to have a selectivity for ethane over nitrogen of 20. The calculation used the SRK equation of state and was performed using ChemCad III software (Chemstations Inc., Houston, Tex.) to model the expansion across the membrane. For the first calculation, the pressure on the feed side of the membrane was assumed to be 300 psia and the feed temperature 25° C. The cooling was calculated as a function of stage cut (ratio total permeate flow:total feed flow). The results are shown in Table 2.

TABLE 2

| Stage Cut (%) | Residue/Permeate Temperature (°C.) | ΔT (°C.) |
|---|---|---|
| 20 | 20.3 | −4.7 |
| 30 | 18.0 | −7.0 |
| 40 | 16.3 | −8.7 |
| 50 | 14.7 | −10.3 |
| 60 | 13.5 | −11.5 |
| 70 | 13.2 | −11.8 |

Feed Pressure: 300 psia
Feed Temperature: 25° C.
ΔT: (Residue temp)−(Feed temp)

The calculations were repeated for feed pressures of 600 psia and 900 psia, other conditions remaining the same. The results are shown in Tables 3 and 4.

TABLE 3

| Stage Cut (%) | Residue/Permeate Temperature (°C.) | ΔT (°C.) |
|---|---|---|
| 20 | 15.6 | −9.4 |
| 30 | 11.2 | −13.8 |
| 40 | 7.1 | −17.9 |
| 50 | 3.5 | −21.5 |
| 60 | 1.0 | −24.0 |
| 70 | −0.2 | −25.2 |

Feed Pressure: 600 psia
Feed Temperature: 25° C.
ΔT: (Residue temp)−(Feed temp)

TABLE 4

| Stage Cut (%) | Residue/Permeate Temperature (°C.) | ΔT (°C.) |
|---|---|---|
| 20 | 10.9 | −14.1 |
| 30 | 4.0 | −21.0 |
| 40 | −2.4 | −27.4 |
| 50 | −8.1 | −33.1 |
| 60 | −11.8 | −36.8 |
| 70 | −13.5 | −38.5 |

Feed Pressure: 900 psia
Feed Temperature: 25° C.
ΔT: (Residue temp)−(Feed temp)

As can be seen, measurable cooling would occur in all cases, and it is clear that cooling of at least about 10° C. could be achieved with this gas mixture under various conditions, including pressure drop across the membrane of 285 psia and stage cut of 50% or more, and pressure drop across the membrane of 585 psia and stage cut of 20% or more. Temperature drops of 25° C. to as high as almost 40° C. could be achieved without resorting to extreme conditions.

Example 3 (not in accordance with the invention)

A set of calculations was performed to evaluate the cooling that could be obtained by expanding a mixture of equal volumes of ethane and nitrogen across a membrane expander to a permeate pressure of 1 atm (15 psia). The feed pressure was assumed to be 600 psia. All conditions were assumed to be identical to those for Table 3 above, except that this time the membrane was assumed to have a selectivity for nitrogen over ethane of 20, that is, to be nitrogen selective rather than organic component selective. The results are shown in Table 5.

TABLE 5

| Stage Cut (%) | Residue/Permeate Temperature (°C.) | ΔT (°C.) |
|---|---|---|
| 20 | 25.5 | 0.5 |
| 30 | 26.2 | 1.2 |
| 40 | 27.3 | 2.3 |
| 50 | 29.0 | 4.0 |
| 60 | 29.9 | 4.9 |
| 70 | 26.2 | 1.2 |

Feed Pressure: 600 psia
Feed Temperature: 25° C.
ΔT: (Residue temp)-(Feed temp)

As can be seen, if a nitrogen-selective membrane were used, the residue and permeate streams would be slightly warmer than the feed stream, and the expander would produce no cooling.

Examples 4–12

A series of computer calculations was performed with the ChemCad III modeling program (ChemStations, Inc., Houston, Tex.), to illustrate the process of the invention. To simplify the calculations, it was assumed that the temperatures of the residue and permeate stream from the module are the same.

Example 4 C3+ Recovery

Figure 13:
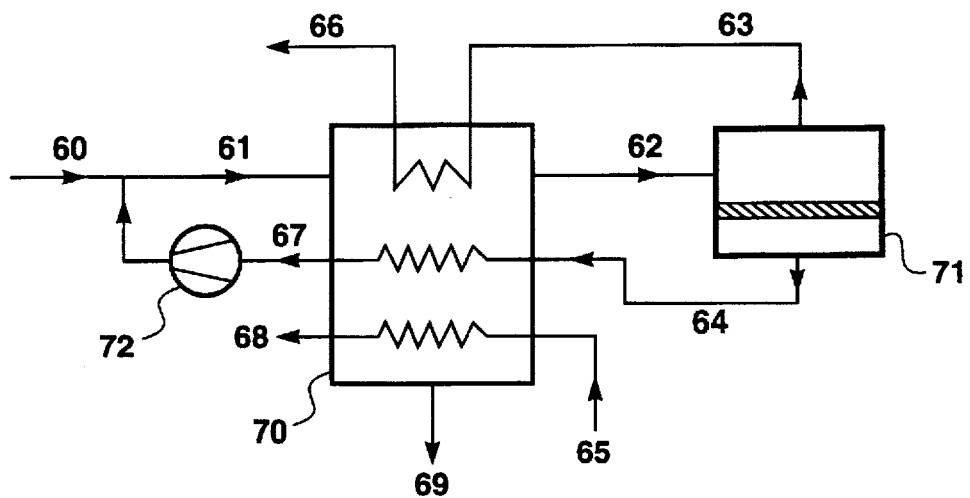
FIG. 13 is a schematic drawing showing an embodiment of the invention in which membrane residue and permeate streams and an external stream are used for cooling, and in which the permeate stream is recompressed and returned to the condenser.

A calculation was performed to model the recovery of $C_{3+}$ hydrocarbons from natural gas as natural gas liquids (NGL) product. The process configuration was assumed to be as in FIG. 13.

Turning to this figure, the feed natural gas stream, 60, at 1,000 psia and 25° C., is mixed with recycled permeate stream 67 to create feed stream 61 to heat exchanger, 70. Cooling is supplied by circulating three cold streams through the heat exchanger: membrane residue stream 63, membrane permeate stream 64, and a propane refrigeration stream, 65. The result is to cool the feed gas from 25° C. to −20° C. A portion of the heavier $C_{3+}$ hydrocarbons in the feed gas condenses and is recovered as NGL stream 69. The non-condensed gas, stream 62, passes to membrane unit 71, containing membranes which are selectively permeable to the $C_{3+}$ fraction of the gas, with a selectivity for propane over methane of 7. Permeate stream 64 is enriched in the $C_{3+}$ vapor components, and residue stream 63 is depleted in the $C_{3+}$ components. The permeate and residue stream emerging from the membrane expander are at −42° C., and are passed to the heat exchanger. The warmed permeate stream emerges as stream 67 from the heat exchanger, and is recompressed in compressor 72 and recycled to the inlet of the heat exchanger. The warmed residue stream emerges from the heat exchanger as stream 66, and may be sent to the pipeline or elsewhere as appropriate. Warmed refrigeration stream 68 is recirculated to the propane refrigeration unit to be chilled and reused as stream 65.

Table 6 shows the results of the calculations.

The propane concentration is reduced from 7 mol % in the raw feed to only 1 mol % in the membrane residue or product gas stream. Expansion through the membrane cools the permeate and residue streams from −20° to −42° C.

TABLE 6

| Stream | 60 | 61 | 62 | 63 | 64 | 65 | 66 | 67 | 68 | 69 |
|---|---|---|---|---|---|---|---|---|---|---|
| Flow (lbmol/h) | 167 | 228 | 188 | 128 | 61 | 167 | 128 | 61 | 167 | 39.6 |
| Flow (lb/h) | 3,361 | 4,738 | 3,516 | 2,139 | 1,377 | 7,369 | 2,139 | 1,377 | 7,369 | 1,222 |
| Temperature (°C.) | 25 | 25 | −20 | −42 | −42 | −29 | 15 | 15 | −29 | −20 |
| Pressure (psia) | 1,000 | 1,000 | 1,000 | 1,000 | 15 | 25 | 1,000 | 15 | 25 | 1,000 |
| Component (mol %) | | | | | | | | | | |
| Methane | 85.0 | 81.9 | 88.5 | 95.8 | 73.3 | 0 | 95.8 | 73.3 | 0 | 50.2 |
| Ethane | 5.0 | 6.3 | 5.4 | 3.2 | 9.9 | 0 | 3.2 | 9.9 | 0 | 10.9 |
| Propane | 7.0 | 8.9 | 5.3 | 1.0 | 14.2 | 100 | 1.0 | 14.2 | 100 | 26.3 |
| N-Butane | 2.0 | 2.0 | 0.7 | 217 ppm | 2.1 | 0 | 217 ppm | 2.1 | 0 | 8.4 |
| N-Pentane | 1.0 | 0.9 | 0.2 | 13 ppm | 0.5 | 0 | 13 ppm | 0.5 | 0 | 4.2 |

Table 7 shows the calculated heat balance between the cooling required to cool stream 61 and the cooling supplied by the three streams to the heat exchanger.

TABLE 7

| | Stream | MMBtu/h | % cooling |
|---|---|---|---|
| Cooling required | Stream 61 | 0.3722 | — |
| Cooling supplied | Stream 63 (residue) | 0.173 | 47 |
| | Stream 64 (permeate) | 0.064 | 17 |
| | Stream 65 (external refrigeration) | 0.135 | 36 |

As can be seen, the residue and permeate streams provide approximately 64% of the cooling required for the condensation process. Only about 36% of the total cooling must be provided by the external refrigeration stream, 65.

The stage cut, that is the volume ratio of permeate to feed, is about 32%, so the residue stream provides the bulk of the cooling from the membrane expander.

Example 5 C3+ Recovery-Varying Condenser Temperature

The calculations of Example 4 were repeated, except that the temperature of the gas stream leaving the heat exchanger was varied. To match the performance of the process of Example 4, the membrane residue stream, 63, was set to contain about 1 mol % propane. Table 8 shows the results of the calculations.

TABLE 8

| Stream 62 Temperature (°C.) | Membrane Area Required (m²) | Compressor capacity (hp) | External Refrigeration Required (MMBtu/h) | Cooling Provided by External Refrigeration (%) |
|---|---|---|---|---|
| 6.3 | 44 | 266 | 0 | 0 |
| −10 | 33 | 189 | 0.089 | 28 |
| −20 | 26 | 148 | 0.135 | 36 |
| −25 | 24 | 129 | 0.159 | 40 |

As can be seen, by using more membrane area, and hence more compressor capacity to recompress the larger permeate stream, the membrane expander not only provides cooling, but also augments the recovery of $C_{3+}$ hydrocarbons. With appropriate choice of membrane area, in this case about 35–45 m², the membrane expander can provide a combination of sufficient cooling and augmented separation that no external refrigeration need be provided to recover the NGL.

Example 6 Propylene Recovery

Figure 14:
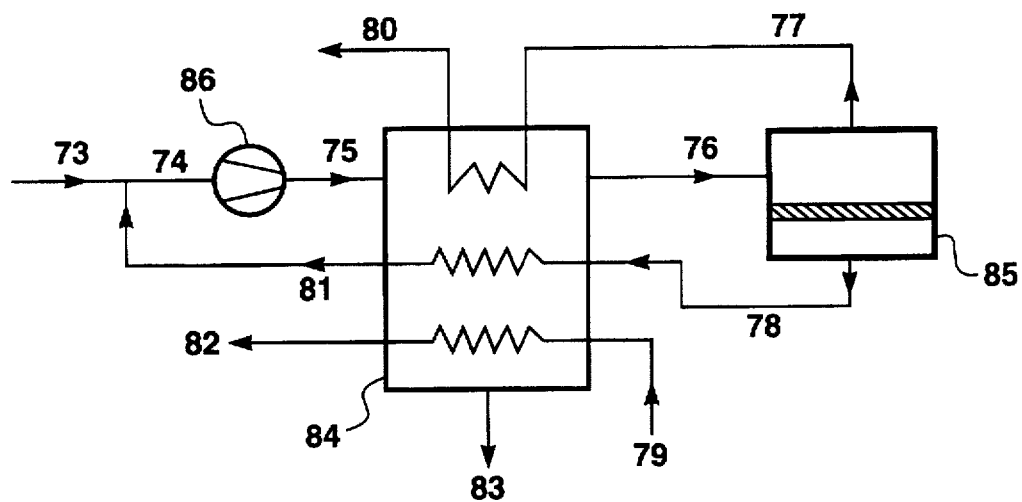
FIG. 14 is a schematic drawing showing an embodiment of the invention in which membrane residue and permeate streams and an external stream are used for cooling, and in which the permeate stream is returned to the main compressor.

A calculation was performed to model the recovery of monomer from a purge gas stream from a polypropylene manufacturing plant. The raw purge gas was assumed to contain 10 mol % propylene, and the calculations were set to reduce the amount of propylene in the recovered purge gas to 1 mol %. The process configuration was assumed to be as in FIG. 14.

Turning to that figure, the gas from the polymer resin purge bins, stream 73, consisting of propylene, nitrogen and other hydrocarbons, is mixed with recycled permeate stream 81 to create feed stream 74 to compressor 86, where the pressure of the gas is raised to 300 psia. The compressed gas, stream 75, is fed to heat exchanger 84. Cooling for the feed gas is supplied by circulating three cold streams through the heat exchanger: membrane residue stream 77, membrane permeate stream 78, and a propylene refrigeration stream, 79. The result is to cool the feed gas from 25° C. to −20° C. A portion of the propylene monomer and other hydrocarbons in the feed gas condenses and is recovered as liquid stream 83. The non-condensed gas, stream 76, passes to membrane unit 85, containing membranes which are selective for the organic components over nitrogen, with a selectivity for propylene over nitrogen of 12, so that permeate stream 78 is enriched in organics, and residue stream 77 is depleted in organics. The permeate and residue stream emerging from the membrane expander are at −27° C., and are passed to the heat exchanger. The warmed permeate stream emerges as stream 81 from the heat exchanger, and is passed back to compressor 86 and recycled for further monomer capture. The warmed residue stream emerges from the heat exchanger as stream 80, and can be reused in the purge bin. Warmed refrigeration stream 82 is recirculated to the propane refrigeration unit to be chilled and reused as stream 79.

The results of the calculations are shown in Table 9.

TABLE 9

| Stream | 73 | 74 | 75 | 76 | 77 | 78 | 79 | 80 | 81 | 83 |
|---|---|---|---|---|---|---|---|---|---|---|
| Flow (lbmol/h) | 167 | 252 | 252 | 225 | 140 | 84.7 | 1,671 | 140 | 84.7 | 27.2 |
| Flow (lb/h) | 5,303 | 8,061 | 8,061 | 6,711 | 3,954 | 2,758 | 70,324 | 3,954 | 2,758 | 1,349 |
| Temperature (°C.) | 25 | 21 | 25 | −20 | −27 | −27 | −35 | 15 | 15 | −20 |
| Pressure (psia) | 25 | 15 | 300 | 300 | 300 | 15 | 25 | 300 | 15 | 300 |
| Component (mol %) | | | | | | | | | | |
| Nitrogen | 80 | 72.7 | 72.7 | 81.1 | 94.9 | 58.3 | 0 | 94.9 | 58.3 | 3.0 |
| Propylene | 10 | 15.8 | 15.8 | 10.9 | 1.0 | 27.2 | 100 | 1.0 | 27.2 | 56.4 |
| N-butane | 2.5 | 2.1 | 2.1 | 0.5 | 235 ppm | 1.4 | 0 | 235 ppm | 1.4 | 15.3 |
| N-hexane | 2.5 | 1.7 | 1.7 | 298 ppm | 6 ppm | 0.1 | 0 | 6 ppm | 0.1 | 15.4 |
| Ethane | 5 | 7.7 | 7.7 | 7.5 | 4.0 | 13.1 | 0 | 4.0 | 13.1 | 10.0 |

Table 10 shows the calculated heat balance between the cooling required to cool stream 75 and the cooling supplied by the three streams to the heat exchanger.

TABLE 10

| | Stream | MMBtu/h | % cooling |
|---|---|---|---|
| Cooling required | Stream 75 | 0.377 | — |
| Cooling supplied | Stream 77 (residue) | 0.081 | 21 |
| | Stream 78 (permeate) | 0.063 | 17 |
| | Stream 79 (external refrigeration) | 0.233 | 62 |

Because the feed gas to the membrane expansion step is over 80 mol % nitrogen and the pressure drop across the membrane is 285 psia, the temperature drop from the feed to the permeate and residue streams is about 7° C. However, even with this relatively modest cooling, the residue and permeate streams provide approximately 38% of the cooling required for the condensation process.

The stage cut in this case is about 40%, so that the residue and permeate streams contribute about equally to the cooling provided by the expander.

Example 7 Propylene Recovery-Varying Feed Composition

The calculations of Example 6 were repeated, except that the hydrocarbon content of the feed gas stream was increased to 30 mol %, as follows:

| Propylene | 15 mol % |
|---|---|
| n-Butane | 2.5 |
| n-Hexane | 2.5 |
| Ethane | 10. | and then to 40 mol %, as follows:

| Propylene | 20 mol % |
|---|---|
| n-Butane | 2.5 |
| n-Hexane | 2.5 |
| Ethane | 15. |

As in Example 6, the calculations were set to reduce the propylene content of the treated purge gas to 1 mol %. Table 11 summarizes the results of the calculations.

TABLE 11

| Feed Hydro-carbon Content (%) | Temperature Drop across Membrane (°C.) | Membrane Area Required (m²) | Theoretical Compressor hp | External Cooling Required (MMBtu/h) | (%) |
|---|---|---|---|---|---|
| 20 | 7 | 130 | 423 | 0.233 | 62 |
| 30 | 8.6 | 122 | 418 | 0.318 | 68 |
| 40 | 13 | 51 | 458 | 0.345 | 71 |

As can be seen, the higher the hydrocarbon content of the feed, the greater is the temperature drop provided by the membrane expander. However, the increase in hydrocarbon content increases the amount of material to be condensed, so the proportion of cooling provided by the membrane decreases. As was seen in Table 8, equivalent process results can be achieved either with modest membrane area but significant external cooling, or larger membrane area but less external cooling.

Example 8 Recovery of Ethylene from an Ethylene Cracker Process

A calculation was performed to model the recovery of ethylene and $C_{2+}$ hydrocarbons from an ethylene cracker product gas. The process configuration was assumed to be as in FIG. 14. The raw stream from the cracker was assumed to have the composition shown as in column 73 of the table below and to be available to our process at 25° C. and 25 psia. Compressor 86 was assumed to raise the pressure of the gas to 500 psia. The heat exchanger cools the feed gas from 25° C. to –40° C. The membrane was assumed to have a selectivity for ethylene over methane of 3. The calculation was set to reduce the ethylene content of residue stream 80 to 1 mol % ethylene. The results of the calculations are shown in Table 12.

TABLE 12

| Stream | 73 | 74 | 75 | 76 | 77 | 78 | 79 | 80 | 81 | 83 |
|---|---|---|---|---|---|---|---|---|---|---|
| Flow (lbmol/h) | 167 | 657 | 657 | 550 | 59.5 | 490 | 1,671 | 59.5 | 490 | 107 |
| Flow (lb/h) | 3,849 | 12,367 | 12,367 | 9,050 | 526 | 8,524 | 70,324 | 525 | 8,518 | 3,316 |
| Temperature (°C.) | 25 | 18 | 25 | –40 | –67 | –67 | –47 | 15 | 15 | –40 |
| Pressure (psia) | 25 | 15 | 500 | 500 | 500 | 15 | 15 | 500 | 15 | 500 |
| Component (mol %) | | | | | | | | | | |
| Hydrogen | 20 | 24.9 | 24.9 | 29.4 | 52.7 | 26.6 | 0 | 52.7 | 26.6 | 1.8 |
| Methane | 25 | 31.7 | 31.7 | 35.3 | 45.8 | 34.0 | 0 | 45.8 | 34.0 | 13.4 |
| Ethane | 5 | 3.4 | 3.4 | 2.6 | 0.4 | 28.6 | 0 | 0.4 | 28.6 | 7.5 |
| Propane | 1 | 0.4 | 0.4 | 0.1 | 7 ppm | 0.1 | 0 | 7 ppm | 1.3 | 1.6 |
| N-butane | 6 | 17.6 | 17.6 | 0.3 | 0 | 0.3 | 0 | 0 | 3.2 | 9.4 |
| Ethylene | 35 | 34.8 | 34.8 | 31.1 | 1.0 | 34.8 | 0 | 1.0 | 34.8 | 53.9 |
| Propylene | 8 | 3.0 | 3.0 | 1.1 | 12 ppm | 1.3 | 100 | 12 ppm | 12.9 | 12.5 |

As can be seen, the membrane expander produces residue and permeate streams at –67° C., 27° C. colder than the feed. Table 13 shows the calculated heat balance between the cooling required to cool stream 75 and the cooling supplied by the three streams to the heat exchanger.

TABLE 13

| Stream | | MMBtu/h | % cooling |
|---|---|---|---|
| Cooling required | Stream 75 | 1.253 | — |
| Cooling supplied | Stream 77 (residue) | 0.069 | 5 |
| | Stream 78 (permeate) | 0.610 | 49 |
| | Stream 79 (external refrigeration) | 0.574 | 46 |

In this case, the stage cut is very high, at 89%. Thus about half of the total cooling required is provided by the permeate stream, compared with only about 5% contribution from the membrane residue stream. The membrane expander reduces the external refrigeration load by 54%.

Example 9 Ethylene Recovery using Two Condensation Units

Figure 15:
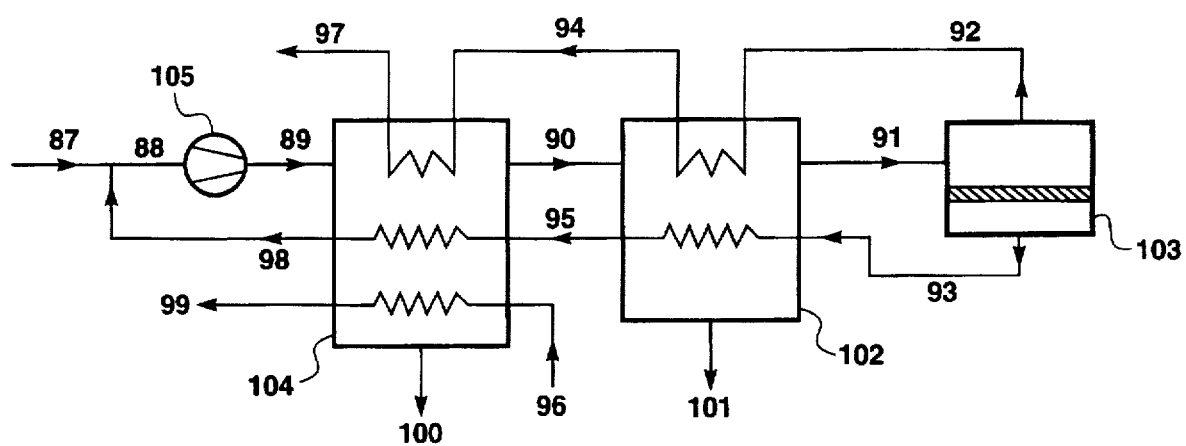
FIG. 15 is a schematic drawing showing an embodiment of the invention in which membrane residue and permeate streams are used for cooling in two condensers, in one of which additional cooling is provided from an outside source.

The calculations of Example 8 were repeated, except that two separate heat exchangers, operating at –30° C. and –40° C., were assumed to be used to cool the feed gas stream, as shown in FIG. 15.

In this figure, the feed gas, 87, is mixed with recycled permeate stream 98 to create stream 88 to compressor 105. The compressed gas, stream 89, is fed to the first heat exchanger 104, operating at −30° C. A portion of the ethylene product is condensed and recovered as liquid stream 100. Cooling for this heat exchanger is supplied by three streams: membrane residue stream 94, membrane permeate stream 95, and a propylene refrigeration stream, 96. The non-condensed gas, stream 90, from the first heat exchanger passes to second heat exchanger, 102, operating at −40° C. This heat exchanger is cooled only by permeate stream 93 and residue stream 92. A portion of the ethylene in stream 90 condenses and is recovered as liquid stream 101. The remaining non-condensed gas, stream 91, passes to membrane unit 103. Permeate stream 93 is enriched in ethylene and residue stream 92 is depleted in ethylene. These streams provide all the cooling for the second heat exchanger. The warmed permeate stream emerges as stream 95 from the second heat exchanger, passes through the first heat exchanger, and emerges as stream 98, which is recompressed in compressor 105 and recycled to the inlet of the heat exchanger. The warmed residue stream emerges from the second heat exchanger as stream 94, passes through the first heat exchanger and emerges as stream 97. Warmed refrigeration stream 99 is recirculated to the propane refrigeration unit to be chilled and reused as stream 96.

The calculations were set to achieve the same result in terms of the ethylene product streams and the hydrogen/methane residue stream. The results of the calculations are shown in Table 14.

same. However, in this example, the two-condenser case, the external refrigeration needed can be supplied at −30° C., rather than −40° C. This results in a significant reduction in refrigeration costs.

Example 10 Condenser Cools Permeate Stream (Membrane in Front of Condenser)

A calculation was performed to model the recovery of NGL from a natural gas stream. It was assumed that the process configuration was as in FIG. 12, that is, the expander was assumed to be positioned upstream of the condenser, so that the expander divides the raw feed into residue and permeate portions, and the permeate passes to the condenser. The raw natural gas was assumed to be available to our process at 20° C. and 1,000 psia and to have the composition shown in column 51 of the Table. The condenser was assumed to operate at 6° C.

The results of the calculations are shown in Table 16.

TABLE 16

| Stream | 51 | 52 | 53 | 56 | 57 | 58 |
|---|---|---|---|---|---|---|
| Flow (lbmol/h) | 167 | 121 | 46.6 | 46.6 | 18.1 | 28.5 |
| Flow (lb/h) | 3,361 | 2,135 | 1,226 | 1,226 | 643 | 2,135 |
| Temperature (°C.) | 20 | 4.4 | 4.4 | 25 | 6.2 | 6.2 |
| Pressure (psia) | 1,000 | 1,000 | 100 | 1,000 | 1,000 | 1,000 |

TABLE 14

| Stream | 87 | 89 | 90 | 91 | 92 | 93 | 94 | 96 | 98 | 100 | 101 |
|---|---|---|---|---|---|---|---|---|---|---|---|
| Flow (lbmol/h) | 167 | 735 | 684 | 629 | 61.3 | 568 | 61.3 | 100 | 568 | 50.8 | 55.2 |
| Flow (lb/h) | 3,849 | 14,025 | 10,176 | 10,722 | 551 | 10,171 | 551 | 4,208 | 10,176 | 1,679 | 1,624 |
| Temperature (°C.) | 25 | 25 | −30 | −40 | −70 | −70 | −33 | −47 | 15 | −30 | −40 |
| Pressure (psia) | 25 | 500 | 500 | 500 | 500 | 15 | 500 | 15 | 15 | 500 | 500 |
| Component (mol %) | | | | | | | | | | | |
| Hydrogen | 20 | 23.6 | 25.3 | 27.4 | 51.6 | 24.7 | 51.6 | 0 | 24.7 | 1.7 | 1.7 |
| Methane | 25 | 31.4 | 32.9 | 34.6 | 46.9 | 33.3 | 46.9 | 0 | 33.3 | 11.2 | 13.4 |
| Ethane | 5 | 3.4 | 3.2 | 2.8 | 0.5 | 3.0 | 0.5 | 0 | 3.0 | 7.4 | 7.9 |
| Propane | 1 | 0.3 | 0.2 | 0.1 | 5 ppm | 0.1 | 5 ppm | 0 | 0.1 | 1.9 | 1.3 |
| N-butane | 6 | 1.5 | 0.6 | 0.2 | 0 | 0.2 | 0 | 0 | 0.2 | 14.3 | 5.0 |
| Ethylene | 35 | 36.9 | 36.0 | 33.9 | 1.0 | 37.4 | 1.0 | 0 | 37.4 | 48.9 | 60.0 |
| Propylene | 8 | 2.7 | 1.8 | 1.1 | 9 ppm | 1.2 | 9 ppm | 100 | 1.2 | 14.6 | 10.7 |

The heat balance for the two heat exchangers is shown in Table 15.

TABLE 15

| Condenser 102 | Stream | MMBtu/h | % cooling |
|---|---|---|---|
| Cooling required | Stream 90 | 0.344 | — |
| Cooling supplied | Stream 92 (residue) | 0.033 | 9 |
| | Stream 93 (permeate) | 0.311 | 91 |
| | (external refrigeration) | 0 | 0 |

| Condenser 104 | Stream | MMBtu/h | % cooling |
|---|---|---|---|
| Cooling required | Stream 89 | 0.993 | — |
| Cooling supplied | Stream 94 (residue) | 0.041 | 4 |
| | Stream 95 (permeate) | 0.419 | 42 |
| | Stream 96 (external refrigeration) | 0.533 | 54 |

In this example and the previous one, the total amount of refrigeration and the external cooling required are about the TABLE 16-continued

| Component (mol %) | | | | | | |
|---|---|---|---|---|---|---|
| Methane | 85 | 92.6 | 65.2 | 65.2 | 39.1 | 81.9 |
| Ethane | 5 | 3.7 | 8.4 | 8.4 | 10.6 | 7.0 |
| Propane | 7 | 3.0 | 17.3 | 17.3 | 30.5 | 9.0 |
| N-butane | 2 | 0.5 | 5.9 | 5.9 | 12.6 | 1.6 |
| N-pentane | 1 | 0.2 | 3.1 | 3.1 | 7.3 | 0.5 |

The membrane expander produces residue and permeate streams at 4° C. No external refrigeration need be provided. The residue natural gas stream contains 3 mol % propane.

Example 11

A computer calculation similar to those of Examples 6 and 7 was performed using ChemCad III software (Chemstations Inc., Houston, Tex.) to model the treatment of a vent stream from a purge bin in a polypropylene manufacturing plant. In this case, however, the process configuration was assumed to be as in FIG. 16. That is, it was assumed that the liquid condensate from the heat exchanger is flashed, and the cold liquid from the flash tank is used in conjunction with the streams from the membrane expander to provide cooling. It was further assumed that the gas phase from the flash separator was returned and added to the membrane permeate stream before it passed into the heat exchanger.

Raw stream, 110, was assumed to have the composition shown in Table 17, plus traces of other non-condensable gases not shown in the table, to be at 30 psia and 35° C., and to be compressed to 200 psia. The results of the calculations are summarized in Table 17.

TABLE 17

| Stream | 110 | 112 | 113 | 114 | 115 | 116 | 118 | 117 |
|---|---|---|---|---|---|---|---|---|
| Flow (lb/h) | 5,000 | 8,730 | 6,842 | 3,265 | 3,577 | 1,890 | 156 | 1,734 |
| Temp. (°C.) | 35 | 35 | −34 | −40 | −40 | −34 | −48 | −48 |
| Pressure (psia) | 30 | 200 | 200 | 184 | 32 | 200 | 25 | 25 |
| Component (mol %): | | | | | | | | |
| Propylene | 25.0 | 25.9 | 13.8 | 1.9 | 26.1 | 85.7 | 53.1 | 89.1 |
| Propane | 2.0 | 1.9 | 1.0 | 0.13 | 1.8 | 6.9 | 3.6 | 7.2 |
| Ethylene | 2.0 | 6.1 | 6.3 | 1.4 | 11.3 | 5.2 | 21.1 | 3.6 |
| Nitrogen | 70.0 | 64.5 | 77.1 | 95.1 | 58.6 | 2.0 | 21.0 | — |

- less than 0.01%

As can be seen, the process can produce an essentially pure monomer stream suitable for reuse, and a purge gas stream from the membrane containing 95 mol % nitrogen. This is accomplished without any external cooling. In this configuration, however, the purified monomer stream, 117, vaporizes in the heat exchanger, and so the product leaves the process as a gas rather than a liquid.

Example 12 Flux and Selectivity Improvement

This example illustrates an additional benefit of the invention, that is, the improvement in flux and selectivity of the membrane that can result when the feed gas is cooled.

Two computer calculations were performed to model the separation of ethylene from nitrogen, in a mixture of 30 mol % ethylene/70 mol % nitrogen, a model for streams that might arise in the recovery of ethylene from purge gas streams produced in polyethylene plants, for example.

The first calculation assumes that both the residue and permeate streams are used for cooling, as in FIG. 4, so that the feed stream to the membrane is at −40° C.

The second calculation assumed simply that the feed was supplied to the membrane at 25° C. Both calculations were set to treat 1,000 scfm of gas to produce a residue stream containing 5 vol % ethylene.

The results of the calculations are given in Tables 18 (first calculation, in accordance with the invention) and 19 (not in accordance with the invention).

TABLE 18

| Stream | Feed | 13 | 14 | 2 | Permeate | Residue |
|---|---|---|---|---|---|---|
| Volume Flow (scfm) | 1,000 | 646 | 354 | 1,000 | 354 | 646 |
| Pressure (psia) | 500 | 500 | 15 | 500 | 15 | 500 |
| Temperature (°C.) | 25 | −54.6 | −54.6 | −40 | 16 | 6 |
| Nitrogen (mol %) | 70 | 95 | 24.4 | 70 | 24.4 | 95 |
| Ethylene (mol %) | 30 | 5 | 75.6 | 30 | 75.6 | 5 |

Membrane area: 47 m²

TABLE 18-continued

| Stream | Feed | 13 | 14 | 2 | Permeate | Residue |
|---|---|---|---|---|---|---|

Methane/Nitrogen selectivity: 20
Nitrogen flux: 40 × 10⁻⁶ cm³(STP)/cm² · sec · cmHg

TABLE 19

| Stream | Feed | Residue | Permeate |
|---|---|---|---|
| Volume Flow (scfm) | 1,000 | 500 | 500 |
| Pressure (psia) | 500 | 500 | 15 |
| Temperature | 25 | 15 | 15 |
| Nitrogen (mol %) | 70 | 95 | 45 |
| Ethylene (mol %) | 30 | 5 | 55 |

Membrane area: 62.2 m²
Methane/Nitrogen selectivity: 7
Nitrogen flux: 80 × 10⁻⁶ cm³(STP)/cm² · sec · cmHg Both systems treated the same feed gas and produced the same fractional removal of ethylene from the gas, producing a residue gas containing 5 vol % ethylene. However, the concentration of ethylene in the permeate gas was calculated to be much higher in the process of the invention, 76 mol % ethylene compared to 55 mol % ethylene without cooling the feed stream. The improved membrane separation performance is due to the drop in temperature of the feed stream from 25° C. to −40° C. This improved performance typically reduces the cost of further downstream processing. The membrane area required for the separation is also reduced by 24%.

We claim:

1. A process for recovering an organic component of a gas stream in condensed form, comprising the following steps:
   (a) using an organic-component selective semipermeable membrane as an expansion device to expand a portion of a feed gas supplied to said membrane through said membrane to its permeate side, thereby producing a cooled permeate stream and a cooled residue stream, said cooled residue and permeate streams having temperatures at least about 5° C. lower than said feed gas; and
   (b) using at least one of said cooled residue and cooled permeate streams resulting from said step (a) to cool said gas stream upstream of said membrane by heat exchange, thereby inducing condensation of at least some of said organic component upstream of said membrane and leaving an uncondensed gas stream that is supplied as feed gas to said membrane in said step (a).

2. The process of claim 1, wherein said cooled permeate stream is used in step (b).

3. The process of claim 1, wherein said cooled residue stream is used in step (b).

4. The process of claim 1, wherein said cooled permeate stream and said cooled residue stream are both used in step (b).

5. The process of claim 1, further comprising supplying additional cooling from an external source to facilitate condensation of said organic component in step (b).

6. The process of claim 1, further comprising returning said permeate stream for condensation in step (b).

7. The process of claim 1, wherein said step (a) produces at least one cooled stream that has a temperature at least about 10° C. lower than said feed gas.

8. The process of claim 1, wherein said step (a) produces at least one cooled stream that has a temperature at least about 15° C. lower than said feed gas.

9. The process of claim 1, wherein said step (a) produces at least one cooled stream that has a temperature at least about 20° C. lower than said feed gas.

10. The process of claim 1, wherein said organic component comprises ethylene.

11. The process of claim 1, wherein said organic component comprises propylene.

12. The process of claim 1, wherein said organic component comprises a $C_{3+}$ hydrocarbon.

13. The process of claim 1, wherein said organic component comprises multiple organic components.

14. The process of claim 1, wherein said gas stream comprises natural gas.

15. The process of claim 1, wherein said portion is at least about 30 vol % of said feed gas.

16. The process of claim 1, wherein said portion is at least about 50 vol % of said feed gas.

17. The process of claim 1, wherein said feed gas contains at least about 5 vol % organic component.

18. The process of claim 1, wherein said feed gas contains at least about 10 vol % organic component.

19. The process of claim 1, wherein said feed gas contains at least about 20 vol % organic component.

20. The process of claim 1, wherein said membrane removes at least about 90 vol % of said organic component from said feed gas.

21. The process of claim 1, wherein said membrane removes at least about 95 vol % of said organic component from said feed gas.

22. The process of claim 1, wherein said step (a) is carried out with a feed/permeate pressure drop of at least about 200 psi.

23. The process of claim 1, wherein said step (a) is carried out with a feed/permeate pressure drop of at least about 300 psi.

24. The process of claim 1, wherein said step (a) is carried out with a feed/permeate pressure drop of at least about 500 psi.

25. The process of claim 1, wherein step (b) is carried out in two heat-exchange passes between said cooled stream and said gas stream.

26. The process of claim 25, further comprising supplying additional cooling from an external source to facilitate condensation of said organic component in one of said heat-exchange passes.

27. The process of claim 1, further comprising compressing said gas stream prior to said step (b).

28. The process of claim 1, further comprising drawing a partial vacuum on said permeate side.

29. A process for recovering an organic component of a gas stream in condensed form, comprising the following steps:

(a) using an organic-component selective semipermeable membrane as an expansion device to expand a portion of a feed gas supplied to said membrane through said membrane to its permeate side, thereby producing a cooled permeate stream and a cooled residue stream, said cooled residue and permeate streams having temperatures at least about 5° C. lower than said feed gas; and (b) using at least one of said cooled residue and cooled permeate streams resulting from said step (a) to cool said permeate stream by heat exchange, thereby inducing condensation of at least some of said organic component.

30. The process of claim 29, wherein said cooled permeate stream is used in step (b).

31. The process of claim 29, wherein said cooled residue stream is used in step (b).

32. The process of claim 29, wherein said cooled permeate stream and said cooled residue stream are both used in step (b).

33. The process of claim 29, further comprising supplying additional cooling from an external source to facilitate condensation of said organic component in step (b).

34. The process of claim 29, wherein said step (a) produces at least one cooled stream that has a temperature at least about 10° C. lower than said feed gas.

* * * * *